US006614909B1

United States Patent
Ryu et al.

(10) Patent No.: US 6,614,909 B1
(45) Date of Patent: Sep. 2, 2003

(54) METHODS, SYSTEMS, AND CIRCUITS FOR GENERATING KEYS FOR PUBLIC KEY CRYPTOSYSTEMS USING PARALLEL PROCESSING FOR MODULAR OPERATIONS OF IC CARDS

(75) Inventors: Seung-suk Ryu, Seoul (KR); Kyung-hee Lee, Kyungki-do (KR); Young-tae Cha, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/349,827

(22) Filed: Jul. 8, 1999

(30) Foreign Application Priority Data

Jul. 22, 1998 (KR) ......................... 1998-29528

(51) Int. Cl.[7] ............................... H04L 9/00
(52) U.S. Cl. ..................... 380/30; 380/286; 380/28; 380/277; 380/282; 713/157; 713/176; 713/180; 713/201
(58) Field of Search ................. 380/30, 277, 286, 380/28; 713/180, 176, 185, 157, 189, 201

(56) References Cited

U.S. PATENT DOCUMENTS 5,513,133 A    4/1996   Cressel et al. .............. 364/754
5,768,389 A  * 6/1998   Ishii ........................... 380/30
6,151,676 A  * 11/2000  Cuccia et al. ................ 713/176

FOREIGN PATENT DOCUMENTS

JP         8123670         3/1996

OTHER PUBLICATIONS

Official Action (w/translation) for Korean Patent Application No. 10–1998–0029528 dated Sep. 27, 2000.
Dussé et al., "A Cryptographic Library for the Motorola DSP56000," Eurocrypt '90: Advances in Cryptology, pp. 230–244, 1991.
Montgomery, P.L., "Modular Multiplication Without Trial Division," Mathematics of Computation, vol. 44, No. 170, pp. 519–521, Apr. 1985.

* cited by examiner

*Primary Examiner*—Ly V. Hua
(74) *Attorney, Agent, or Firm*—Myers Bigel Sibley & Sajovec

(57) ABSTRACT

Modular operations are used to perform encryption/decryption of keys in a public cryptosystem. The modular operations process a first data in parallel with a second data to provide for the processing of the keys for the public key cryptosystem to determine a key for the public key cryptosystem based on the first and second data. Providing the keys in parallel may allow a reduction in the size of the intermediate results generated through the operations performed using the keys. Reducing the size of the intermediate results may allow smaller registers to be used to implement a public key cryptosystem.

19 Claims, 3 Drawing Sheets

FIG. 2

| CLOCK | IN1 | IN2 | AM | Mul_out | Sm_out | tmp_Sm |
|---|---|---|---|---|---|---|
| 0 | $A_0$ | 0 | $A_0$ | 0 | 0 | 0 |
| 1 | $S_0$ | 0 | $A_0$ | 0 | 0 | $S_0$ |
| 2 | $S_1$ | $B_0$ | $A_0$ | $A_0B_0$ | $(A_0B_0)_L$ +tmp_Sm $\rightarrow S_0$ | $(A_0B_0)_H+S_1$ |
| 3 | $S_2$ | $B_1$ | $A_0$ | $A_0B_1$ | $(A_0B_1)_L$ +tmp_Sm $\rightarrow S_1$ | $(A_0B_1)_H+S_2$ |
| 4 | $S_3$ | $B_2$ | $A_0$ | $A_0B_2$ | $(A_0B_2)_L$ +tmp_Sm+$C_{a0} \rightarrow S_2$ | $(A_0B_2)_H+S_3$ |
| 5 | $S_4$ | $B_3$ | $A_0$ | $A_0B_3$ | $(A_0B_3)_L$ +tmp_Sm+$C_{a1} \rightarrow S_3$ | $(A_0B_3)_H+S_4$ |
| 6 | $S_0$ | 0 | $S_0$ | 0 | $0$+tmp_Sm+$C_{a2} \rightarrow S_4$ | 0 |
| 7 | $S_0$ | $N_0^*$ | $M_0$ | $S_0N_0^*$ | 0 | $S_0$ |
| 8 | $S_1$ | $N_0$ | $M_0$ | $M_0N_0$ | $(M_0N_0)_L$ +tmp_Sm $\rightarrow S_0$ | $(M_0N_0)_H+S_1$ |
| 9 | $S_2$ | $N_1$ | $M_0$ | $M_0N_1$ | $(M_0N_1)_L$ +tmp_Sm $\rightarrow S_1$ | $(M_0N_1)_H+S_2$ |
| 10 | $S_3$ | $N_2$ | $M_0$ | $M_0N_2$ | $(M_0N_2)_L$ +tmp_Sm+$C_{a0} \rightarrow S_2$ | $(M_0N_2)_H+S_3$ |
| 11 | $S_4$ | $N_3$ | $M_0$ | $M_0N_3$ | $(M_0N_3)_L$ +tmp_Sm+$C_{a1} \rightarrow S_3$ | $(M_0N_3)_H+S_4$ |
| 12 | $A_1$ | 0 | $A_1$ | 0 | $0$+tmp_Sm+$C_{a2} \rightarrow S_4$ | 0 |
| 13 | $S_0$ | 0 | $A_1$ | 0 | 0 | $S_0$ |
| 14 | $S_1$ | $B_0$ | $A_1$ | $A_1B_0$ | $(A_1B_0)_L$ +tmp_Sm $\rightarrow S_0$ | $(A_0B_0)_H+S_1$ |
| 15 | $S_2$ | $B_1$ | $A_1$ | $A_1B_1$ | $(A_1B_1)_L$ +tmp_Sm $\rightarrow S_1$ | $(A_1B_1)_H+S_2$ |
| 16 | $S_3$ | $B_2$ | $A_1$ | $A_1B_2$ | $(A_1B_2)_L$ +tmp_Sm+$C_{a0} \rightarrow S_2$ | $(A_1B_2)_H+S_3$ |
| 17 | $S_4$ | $B_3$ | $A_1$ | $A_1B_3$ | $(A_1B_3)_L$ +tmp_Sm+$C_{a1} \rightarrow S_3$ | $(A_1B_3)_H+S_4$ |
| 18 | $S_0$ | 0 | $S_0$ | 0 | $0$+tmp_Sm+$C_{a2} \rightarrow S_4$ | 0 |
| 19 | $S_0$ | $N_0^*$ | $M_0$ | $S_0N_0^*$ | 0 | $S_0$ |
| 20 | ... | ... | ... | ... | ... | ... |
| 21 | ... | ... | ... | ... | ... | ... |

METHODS, SYSTEMS, AND CIRCUITS FOR GENERATING KEYS FOR PUBLIC KEY CRYPTOSYSTEMS USING PARALLEL PROCESSING FOR MODULAR OPERATIONS OF IC CARDS

FIELD OF THE INVENTION

The present invention relates to the field of cryptography in general and more particularly to public key cryptosystems.

BACKGROUND OF THE INVENTION

In some conventional public key cryptosystems, two keys may be generated by both a sender and a recipient who wish to communicate securely with each other. In particular, the sender and the recipient may generate a public key that may be known to others and a private key which only the creator may know. For example, in a Revest Shamir Adleman (RSA) cryptosystem each user's public key may be publicly known while each user's private key may be known only to the respective user. To send a secure communication, the sender encrypts a message using the recipient's public key. The recipient decrypts the message using the recipient's private key. Similarly, the roles may be reversed wherein the original recipient may wish to respond to the original sender's message. Accordingly, the original recipient encrypts the response using the original sender's public key and the original sender may decrypt the response using the original sender's private key.

It is known to generate the public and private keys used in a public key cryptosystem based on two large prime numbers. For example, the public key may be generated by multiplying two prime numbers while the private key may be generated by applying modular operations to the public key which may cause the public and private keys to be large (i.e., a large number of bits). For example, the two prime numbers described above may include one hundred bits each. Consequently, the encryption and decryption of messages may involve operations with large numbers which may be time consuming without using a dedicated processor and large registers to store intermediate results during the encryption and decryption process. Unfortunately, a dedicated processor and large registers may occupy relatively large portions of a circuit board and be economically unfeasible. In view of the above, the is a need to improve public key cryptosystems that use large numbers to perform encryption and decryption.

SUMMARY OF THE INVENTION

It is, therefore, an object of the present invention to provide for improvement in the encryption and decryption of communications in public key cryptosystems.

It is another object of the present invention to allow a reduction in the size of registers used to carry out modular operations used in encryption and decryption of communications in public key cryptosystems.

It is a further object of the present invention to allow a reduction in the interconnect used to carry out modular operations used in encryption and decryption of communications in public key cryptosystems.

In still another aspect of the present invention, the first and second data are accessed in an external memory device. The external memory device may comprise a dual port synchronous RAM. Using an external memory device may reduce the need to provide large size registers. For example, a portion of the external memory device may be allocated for storage of intermediate results thereby reducing the need to provide dedicated registers on an integrated circuit board which carries the circuitry used to implement the public key cryptosystem according to the present invention.

BRIEF DESCRIPTION OF THE DRAWINGS

FIG. 2 is a table that illustrates operations of the modular operational unit of FIG. 1.

DETAILED DESCRIPTION OF THE PREFERRED EMBODIMENTS OF THE INVENTION

Figure 1:
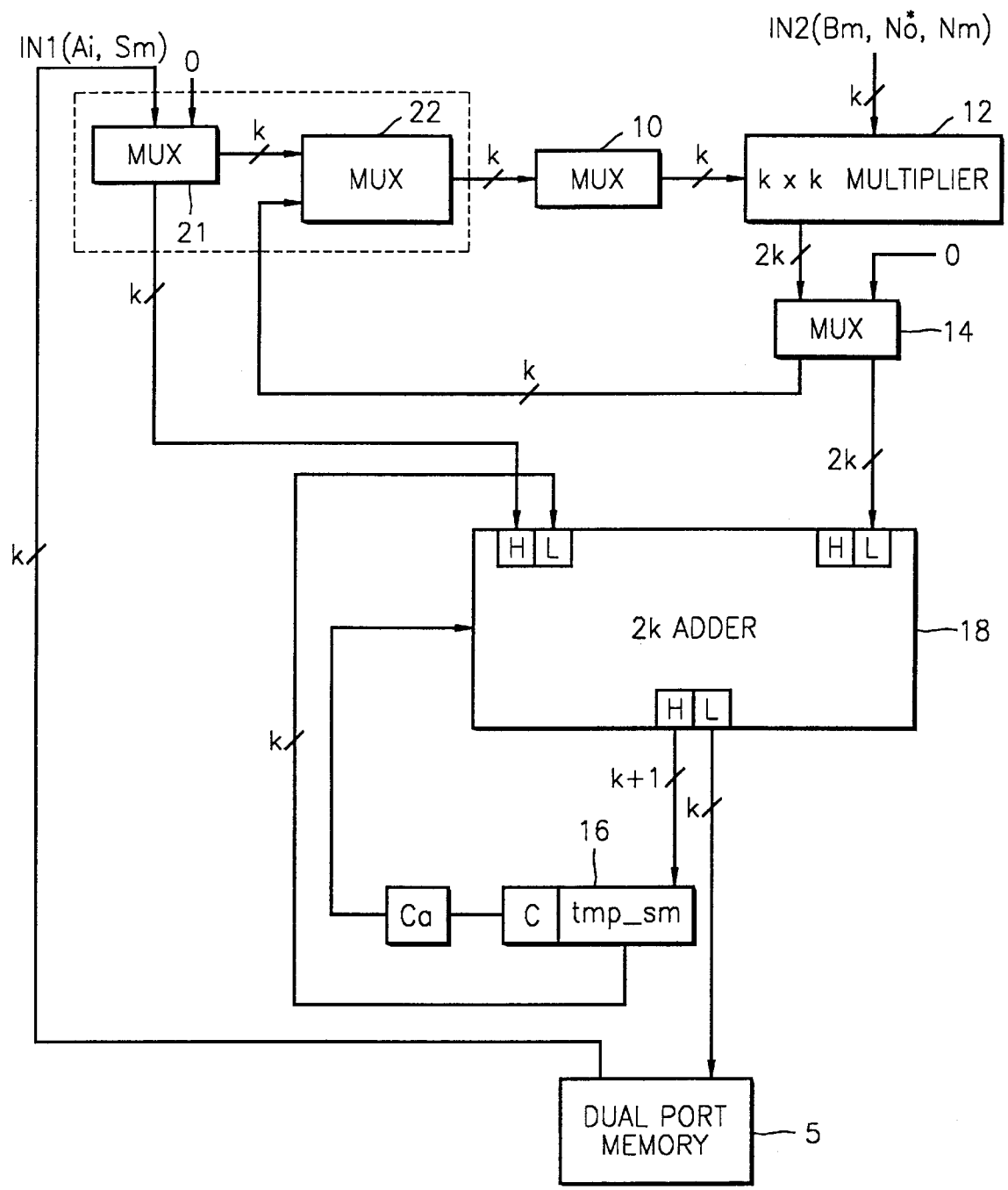
FIG. 1 is a block diagram that illustrates a modular operation unit according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Some public key cryptosystems apply modular operations to prime numbers to encrypt and decrypt data. Unfortunately, modular operations carried out using repeated multiplications and divisions may be difficult to implement. Other public key cryptosystems use Montgomery's modular reduction technique to carry out the modular operations. For example, Montgomery's modular reduction technique may be expressed as:

$$(A \times B \times 2^{-n}) \bmod N \tag{1}$$

Using Montgomery's modular reduction technique may avert a series of multiplication and division operations on operands that are n and 2n bits long by performing a series of multiplications, additions, and subtractions on operands that are n bits long yielding a result that is n bits long. According to Montgomery's modular reduction technique, the modular operation of Equation 1 may be implemented via the following series of operations:

Step 1: $S = A \times B$

Step 2: $M = (S \times N^*) \bmod 2^n$ (here, $(N^* \times N) \bmod 2^n = -1$, n is the number of bits of N)

Step 3: $S = (S + M \times N^*)/2^n$

Step 4: if $S \geq N$, then $S = S - N$

As shown above, the modular operations may be carried out using three multiplications, one addition and one subtraction. Unfortunately, as the number of bits included in the numbers used in the modular operations of Montgomery's modular reduction technique increases, the size of the registers and amount of interconnect needed may be difficult and expensive to implement.

Montgomery's interleaved modular reduction technique may be used to reduce the complexity of operations involved in Montgomery's modular reduction technique by using shorter operands than those used in Montgomery's modular reduction technique. Montgomery's interleaved reduction technique may allow the size of an n bit operand to be reduced to k(=n/L). A reduction to the k(=n/L) size may be obtained as follows:

```
for (i=0; i<L; and i=i+1)
    {
        for (j=0; j<L; and j=j+1)
        {
            S_{j+1}:S_j = S_{j+1}:S_j + A_i × B_j;   //S_0 is a least significant k bit of S
        }
        M_0 = S_0 × N_0* mod 2^k;   //(N* × N_0) mod 2^k = -1
        for (j=0; j<1; and j=j+1)
        {
            S_{j+1}:S_j = S_{j+1}:S_j + M_0 × N_j;  //S_0 is a low k bit of S
        }
        S = S/2^k;
    }
if (S>N) S = S - N;
```

Referring to FIG. 1, a modular operational unit according to the present invention calculates $(A \times B \times 2^{-n})$ mod N by reading B, N and intermediate values S, $A_i$ and $N_0^*$ from an external memory, via a first input bus IN1 and a second input bus IN2 by the k bit. Here, B, N and S are all n bits long and $A_i$ is kbits and $N_0^* = N_0^{-1}$ (mod $2^k$) and $N_0$ is the least significant kbit block of N. According to the present invention, the first input bus IN1 is shared to provide the inputs A and S, and simultaneously, the second input bus IN2 is shared to provide the inputs of B, N, and $N_0^*$. Providing the inputs via the shared arrangement of the first input bus IN1 and the second input bus IN2 may reduce the amount of interconnect needed to carry out the modular operations according to the present invention. Also, a dual port RAM is used to concurrently input and output the S value.

The modular operational unit according to the present invention includes a first register (AM) 10 for storing kbit data, a second register (tmp_Sm) 16 for temporarily storing (k+1) bit data, a latch means (Ca) for storing the most significant bit prior to one clock of the second register 16, a first selector 14, a second selector 20, a multiplier 12, and an adder 18.

The multiplier 12 generates 2 kbit value by multiplying the kbit data stored in the first register 10 by the kbit data input via the second input bus IN2.

A 2 kbit first input value to the adder 18 comprises kbit data stored in the second register 16 as lower data and kbit data input from the first input bus IN1 as upper data, 2 kbit data input from the first selector 14 is a second input value. The adder 18 adds the first and second input values with a carry input of the bit stored in the latch means Ca, i.e., a 2-clock delayed carry output. The adder 18 outputs the lower kbits to an external dual port memory 5 storing S via a first output bus OUT1 and the upper (k+1) bits, which includes a carry value, to the second register 16. In a preferred embodiment, the multiplier 12 and the adder 18 operate using a single clock.

The first selector 14 includes a first input port for inputting a zero value and a second input port for inputting 2 kbit data from the multiplier 12. The first selector 14 provides a 2 kbit input value to the adder 18 by selecting one of the first or second input ports of the first selector 14. The first selector 14 also has a first output port for outputting lower kbit data of the selected 2 kbit input value to the second selector 20 and a second output port for outputting the selected 2 kbit input value to the adder 18. The selector 14 also determines a destination of the output data by selecting which of the output ports provides data.

The second selector 20, includes a third input port for inputting zero, a fourth input port for inputting kbit data from the first input bus IN1, and a fifth input port for inputting the kbit data output from the first output port of the first selector 14. The second selector 20 selects a kbit input value by selecting the third, the fourth or the fifth input port. The second selector 20 also includes a third output port for providing the selected kbit input value to the first register 10 and a fourth output port for outputting the selected kbit input value to the adder 18. The second selector 20 selects a destination of the output data by selecting one of the output ports of the second selector 20.

As shown in FIG. 1, the second selector 20 includes a first selection portion 21 and a second selection portion 22. The first selection portion 21 includes the third input port for inputting a zero value and a fourth input port for inputting kbit data from the first input bus IN1, and a fourth output port for outputting the selected kbit input value to the adder 18 and a fifth output port for outputting the selected kbit input value to the second selection portion 22 based on the selected destination of the output data. The second selection portion 22 has a fifth input port for inputting kbit data from the first output port of the first selector 14, a sixth input port for inputting kbit data from the fifth output port of the first selection portion 21, and a third output port for outputting the selected kbit value to the first register 10.

FIG. 2 is a table that illustrates operations of the modular operational view of FIG. 1. In the table of FIG. 2, it is assumed that L=4.

First, $A_i$ of kbit data and B, N and $N_0^*$ of n bit data are stored in the external memory 5. An n bit location of the external memory is allocated in which to store intermediate values of S and are initialized to zero.

(1) At the zero clock, $A_0$ is input via the first input bus IN1 and stored in the first register 10.

(2) At the first clock, So (input via the first input bus IN1) is added to zero by the adder 18 and then stored in the second register 16. That is, the second register 16 is initialized with $S_0$. Simultaneously, zero is input via the second input bus IN2.

(3) At the second clock, $S_1$ is input via the first input bus IN1 and $B_0$ is input via the second input bus IN2, and an operation, $(A_0 \times B_0)$, is performed by the multiplier 12. The result of the operation by the multiplier 12 is input to the adder 18 which performs an operation, $(A_0 \times B_0 + S_1:S_0)$. A lower kbit is output and stored in $S_0$ and an upper (k+1) bit is stored in the second register 16 for use in the next addition.

(4) At the third clock, $S_2$ is input via the first input bus IN1 and $B_1$ is input via the second input bus IN2 and an operation, $(A_0 \times B_1)$, is performed by the multiplier 12. The result of the operation by the multiplier 12 is input to the adder 18 which performs an operation, $(A_0 \times B_1 + S_2:tmp\_Sm)$. A lower kbit is output and stored in $S_1$ and a higher (k+1) bit is stored in the second register 16 for use in the next addition operation.

(5) At the fourth clock, $S_3$ is input via the first input bus IN1 and $B_2$ is input via the second input bus IN2 and an operation, $(A_0 \times B_2)$, is performed by the multiplier 12. The result of the operation by the multiplier 12 is input to the adder 18 which performs an operation, $(A_0 \times B_2 + S_3:tmp\_Sm + Ca_0)$. A lower kbit is output and stored in $S_2$ and a higher (k+1) bit is stored in the second register tmp_Sm for use in the next addition operation.

(6) Processing continues until $B_3$ is input and processed in a fashion analogous to that described above. The value stored in the second register 16 is stored in $S_4$.

(7) At the seventh clock, $S_0$ is input via the first input bus IN1 and $N_0^*$ is input via the second input bus IN2. An operation, $(S_0 \times N_0^*)$, is performed by the multiplier 12. The result of the operation by the multiplier 12 ($M_0$), is stored in the first register 10.

(8) At the eighth clock, $S_1$ is input via the first input bus IN1 and $N_0$ is input via the second input bus IN2 and an operation, $(M_0 \times N_0)$, is performed by the multiplier 12. The result of the operation by the multiplier 12 is input to the adder 18 which performs an operation, $(M_0 \times N_0 + S_1 : S_0)$. A lower kbit is output and stored in $S_0$ and a upper (k+1) bit is stored in the second register 16 for use in the next addition operation.

(9) At the ninth clock, $S_2$ is input via the first input bus IN1 and $N_1$ is input via the second input bus IN2 and an operation, $(M_0 \times N_1)$, is performed by the multiplier 12. The result of the operation by the multiplier 12 is input to the adder 18 which performs an operation, $(M_0 \times N_1 + S_2 : \text{tmp\_Sm})$. A lower kbit is output and stored in $S_0$ and an upper (k+1) bit is stored in the second register 16 for use in the next addition operation.

(10) Processing continues until $N_3$ is input and processed in a fashion analogous to that described above. A carry output $Ca_2$ of the adder 18, which is delayed by 2 clocks, is added to the value stored in the second register 16 and stored in $S_3$. Further, by performing the above steps for one clock, the 2-clock delayed carry output $Ca_3$ of the adder 18 is added to the valued stored in the second register 16 and stored in $S_4$.

(11) At every (2L+4) clock, the above steps (1) through (10) are repeated L times with the value $A_i$ stored in the first register 10 as the upper kbit block of A. Thus, the number of clocks needed to perform all the above steps is L(2L+4).

(12) When the value of S is greater than the value of N, the final result is obtained by subtracting the value of N from the value of S.

Figure 3:
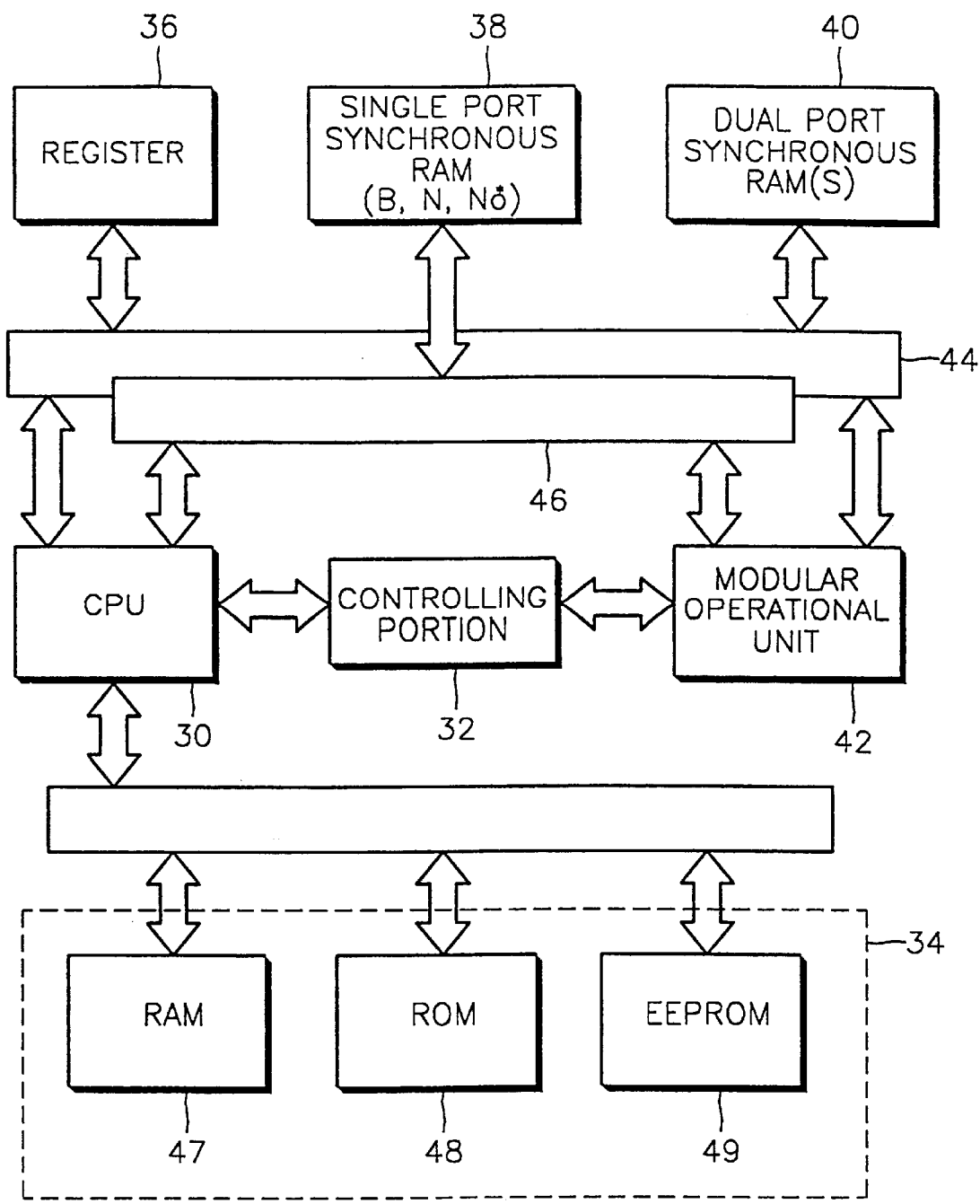
FIG. 3 is a block diagram of an IC card that provides a modular operation function according to the present invention.

According to FIG. 3, an IC card includes a modular operation function which determines $(A \times B \times 2^{-n}) \bmod N$ by calculating $A_i$ and B and N by the kbit block in parallel. The IC card includes a CPU 30, a controlling portion 32, a main memory means 34, a register 36, a first memory means 38, a second memory means 40, a modular operational unit 42, a first bus 44, and a second input bus 46.

The controlling portion 32 generates control signals for a modular operation by receiving an instruction from the CPU 30. The main memory means stores software and data executed by the CPU 30 and may comprise a RAM 47, a ROM 48, and an EEPROM 49. The register 36 temporarily stores the data processed by the CPU 30. In the present invention, an area storing a value A by the kbit is prepared in the register 36.

The first memory means 38 stores values B, N and $N_0^*$ and can be embodied in a single port synchronous RAM. The first memory means 38 is used by assigning a predetermined area in the main memory means 34.

The second memory means 40 stores an intermediate calculation value of and is embodied in a dual port synchronous RAM so that inputs and outputs may be performed concurrently in synchronization with a clock.

The modular operational unit 42, as shown in FIG. 1, performs a modular operation by reading A, B, N, S, and $N_0^*$ from the register 36, the first memory means 38, and the second memory means 40 according to the control signals generated by the controlling portion 32. The first bus 44, connected to the CPU 30, the register 36, the second memory means 40, and the modular operational unit 42 is a transmission path for address signals and data signals. The second bus 46, connected to the CPU 30, the first memory means 38, and the modular operational unit 42, is a transmission path for address signals and data signals.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of processing keys for a public key cryptosystem using modular operations, the method comprising the steps of:
    providing a first data in parallel with a second data to the public key cryptosystem; and
    determining a key for the public key cryptosystem based on the first and second data.

2. The method of claim 1, wherein the step of providing comprises the steps of:
    selecting portions of the first and second data;
    multiplying the selected portions of the first and second data to provide intermediate data results; and
    adding the intermediate data results and the selected portions of the first and second data to provide the keys for the public key cryptosystem.

3. The method of claim 1, wherein the step of providing comprises the step of accessing the first and second data in an external memory device.

4. The method of claim 3, wherein the step of accessing comprises the step of accessing the first and second data in dual port synchronous RAM.

5. The method of claim 1, wherein the step of providing comprises the step of providing the first data in parallel with the second data via a common interconnect.

6. The method of claim 1, wherein the step of determining comprises the steps of:
    storing A, B, and N of n bit respectively in an external memory and storing $N_0^*$ previously calculated in the external memory, and initializing the external memory with zero by assigning an n bit for storing an intermediate calculation value S;
    reading $A_0$ that is the least significant kbit of the value A via a first input bus and storing the read $A_0$ in a first register;
    reading $S_0$ that is the least significant kbit of the value S via the first input bus and adding the read $S_0$ to zero by an adder and storing the same in a second register;
    using a 2-clock delayed carry output of the adder as a carry input, adding a value 2 k, which result from multiplying $B_0$ that is the least significant kbit of the value B and a value stored in the first register, to a value 2 k having an upper kbit value which is $S_1$ that is the second lower kbit of the value S read via the first input bus and a lower kbit value that is the value stored in the second register, storing the least significant kbit of the added value at the position of the least significant kbit of the value S via the first output bus and the most significant (k+1) bit of the added value in the second register, and repeating L times with changing positions of input values B and S and an output value S to kbit upper positions respectively at every clock; and
    adding the carry output of the adder which is 2-clock delayed to the value stored in the second register and storing the added value at the position of the most significant k bit of the value S;

reading $S_0$ that is the least significant kbit of the value S via the first register;

multiplying the $N_0^*$ read via the second input bus by the value stored in the first register and storing a lower kbit of a value 2 k in the first register;

adding $S_0$ that is the least significant kbit of the value S read via the first input bus to zero by the adder and storing the added value in the second register;

using a 2-clock delayed carry output of the adder as a carry input, adding a value 2 k, which result from multiplying $N_0$ that is the least significant kbit of the value N and a value stored in the first register, to a value 2 k having an upper kbit value which is $S_1$ that is the second lower kbit of the value S read via the first input bus and a lower kbit value that is the value stored in the second register, storing the least significant kbit of the added value at the position of the least significant kbit of the value S via the first output bus and the most significant (k+1) bit of the added value in the second register, using values N and S input at every clock as upper kbit value, and repeating (L−1) times storing the output kbit value in sequence from the least significant kbit of the value S at every clock; and adding the carry output of the adder which is 2-clock delayed to the value stored in the second register and storing the added value at the respective positions of a lower kbit than the most significant kbit of the value S and the most significant kbit; and repeating L time the steps (b) and (c) with the value A as an upper kbit value at every (2L+4) clock; and subtracting the value N from the value S when the value S is greater than the value N.

7. A modular operational unit that determines A×B mod N, the modular operational unit comprising:

a first register for temporarily storing kbit data;

a second register for temporarily storing (k+1) bit data;

a latch for storing the most significant bit of the second register of one clock before;

a multiplier for generating 2 kbit data by multiplying the kbit data stored in the first register and the kbit data input from the second input bus;

a first selector including a first input port for inputting zero and a second input port for inputting 2 kbit data from the multiplier, for selecting a 2 kbit input value, and a first output port for outputting a lower kbit data of the selected 2 kbit input value and a second output port for outputting the selected 2 kbit input value as it is, for selecting a destination of the output data;

an adder for adding a first input value of 2 kbit data, having the kbit data stored in the second register as a lower data and the kbit data input from the second selector as upper data, a second input value which is a value output from the second output port of the first selector, and a carry input which is the bits stored in the latch means, and outputting a lower kbit among the values generated by addition to an external memory as an intermediate value S and an upper (k+1) bit to the second register; and a second selector having a third input port for inputting zero, a fourth input port for inputting kbit data from the first input bus, and a fifth input port for inputting kbit data from the first output port of the first selector, for selecting a kbit input value, and a third output port for outputting the selected kbit input value to the first register and a fourth output port for outputting the selected kbit input value to the adder, for selecting a destination of the output data.

8. The modular operational unit of claim 7 further comprising: a first output bus, wherein the values A and S are input via the first input bus by the kbit, the values B, N, and $N_0^*$ are input via the second input bus by the kbit, and the intermediate value S output by the adder is output via the first output bus.

9. The modular operational unit of claim 7, wherein the multiplier and the adder operate using a common clock.

10. The modular operational unit of claim 7, wherein the second selector comprises:

a first selection portion having a third input port for receiving zero and a fourth input port for inputting kbit data from the first input bus, for selecting a kbit input value, and a fourth output port for outputting the selected kbit input value to the adder and a fifth output port for outputting the selected kbit input value, for selecting a destination of the output data; and a second selection portion having a fifth input port for inputting kbit data from the first output port of the first selector and a sixth input port for inputting kbit data from the fifth output port of the first selection portion, for selecting a kbit input value, and a third output port for outputting the selected value to the first register.

11. An IC card having a modular operation function for calculating A×B mod N by parallel-calculating A, B, and N, which are respectively n bit, by the block, where n=k×L, and L is the number of blocks, the IC card comprising:

a CPU;

a controlling portion for generating a control signal for a modular operation according to instructions from the CPU;

main memory means for storing software and data which are executed by the CPU;

a register for storing the value A;

first memory means for storing the values B and N and a value $N_0^*$, wherein $N_0^* = N_0^{-1}$ (mod $2^k$) and $N_0$ is the least significant kbit block of N;

second memory means for storing an intermediate calculation value S;

a modular operational unit for performing a modular operation by reading A, B, N, S, and $N_0^*$ by the kbit from the register, the first memory means, and the second memory means according to the control signal generated from the controlling portion;

a first bus for transmitting an address signal and a data signal by being connected to the CPU, the register, the second memory means, and the modular operational unit; and a second bus for transmitting an address signal and a data signal by being connected to the CPU, the first memory means, and the modular operational unit.

12. The IC card of claim 11, wherein the first memory means is a single port synchronous RAM.

13. The IC card of claim 11, wherein the second memory means is a dual port synchronous RAM.

14. The IC card of claim 11, wherein the first memory means is a part of the main memory means and the second bus is connected to the main memory means.

15. A system of processing keys for a public key cryptosystem using modular operations comprising:

means for providing a first data in parallel with a second data to provide for the processing of the keys for the public key cryptosystem; and means for determining a key for the public key cryptosystem based on the first and second data.

16. The system of claim 15, wherein the means for providing comprises:

means for selecting portions of the first and second data;

means for multiplying the selected portions of the first and second data to provide intermediate data results; and means for adding the intermediate data results and the selected portions of the first and second data to provide the keys for the public key cryptosystem.

17. The system of claim 15, wherein the means for providing comprises means for accessing the first and second data in an external memory device.

18. The system of claim 17, wherein the means for accessing comprises means for accessing the first and second data in dual port synchronous RAM.

19. The system of claim 15, wherein the means for providing comprises means for providing the first data in parallel with the second data via a common interconnect.

* * * * *